United States Patent [19]

Okamura et al.

[11] 4,308,180
[45] Dec. 29, 1981

[54] SULFIDE RESIN FOR RUBBER

[75] Inventors: Haruki Okamura, Osaka; Tetsuo Yamaguchi, Hirakata; Tamaki Ishii, Suita, all of Japan

[73] Assignee: Sumitomo Chemical Company, Limited, Japan

[21] Appl. No.: 131,788

[22] Filed: Mar. 19, 1980

[30] Foreign Application Priority Data

Mar. 22, 1979 [JP] Japan .................. 54-33849

[51] Int. Cl.³ .......................... C08G 14/04
[52] U.S. Cl. ..................... 260/3; 260/37 R; 260/37 N; 260/38; 525/135; 525/150; 528/148; 528/149; 528/153; 528/154; 528/155; 528/156; 528/158
[58] Field of Search ............ 260/3, 37 R, 37 N, 38; 525/135, 150; 528/148, 149, 153, 154, 155, 156, 158

[56] References Cited

U.S. PATENT DOCUMENTS 2,445,736  7/1948  Gottschalk et al. ............. 528/158
3,455,851  7/1969  Meredith et al. ............... 528/158

FOREIGN PATENT DOCUMENTS 1073851  6/1967  United Kingdom.
1138203  12/1968  United Kingdom.

*Primary Examiner*—Maurice J. Welsh
*Attorney, Agent, or Firm*—Wenderoth, Lind & Ponack

[57] ABSTRACT

A rubber composition comprising vulcanizable natural or synthetic rubber and a sulfide resin produced by (1) reacting a component (A) with a componet (B), followed by reacting with a component (D), or (2) reacting a component (A) with a component (B), followed by reacting with a component (C) and a component (D) simultaneously or sequentially, and if desired reacting the resulting phenol resin with an acylating agent, the component (A) being a phenol compound of the following formula, and/or an acylated compound thereof,

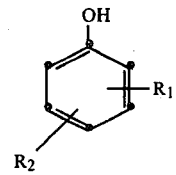

wherein $R_1$ and $R_2$ are each a hydrogen atom, a hydroxyl, carboxyl, amino, $C_1$–$C_{18}$ alkyl, $C_3$–$C_{10}$ cycloalkyl, $C_3$–$C_{10}$ cycloalkenyl or $C_7$–$C_{12}$ aralkyl group or a phenyl group unsubstituted or substituted with at least one $C_1$–$C_3$ alkyl group, the component (B) being a sulfur chloride or sulfur, the component (C) being an aldehyde, and the component (D) being at lest one hydroxyaryl compound of the following formula, and/or an acylated compound thereof,

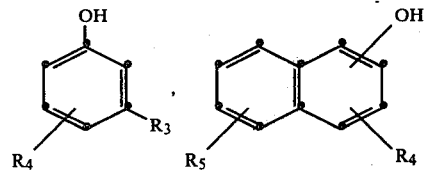

wherein $R_3$ is a —$OR_6$, —$NHR_6$, —$COOR_6$, —$OCOR_6$, phenyl group unsubstituted or substituted with at least one $C_1$–$C_3$ alkyl, $C_1$–$C_{18}$ alkyl, $C_3$–$C_{10}$ cycloalkyl, $C_3$–$C_{10}$ cycloalkenyl or $C_7$–$C_{12}$ aralkyl group, and $R_4$ and $R_5$ are each a hydrogen atom, —$OR_6$, —$NHR_6$, —$COOR_6$, —$OCOR_6$, phenyl group unsubstituted or substituted with at least one $C_1$–$C_3$ alkyl, $C_1$–$C_{18}$ alkyl, $C_3$–$C_{10}$ cycloalkyl, $C_3$–$C_{10}$ cycloalkenyl or $C_7$–$C_{12}$ aralkyl group in which $R_6$ is a hydrogen atom or a $C_1$–$C_4$ alkyl group.

11 Claims, No Drawings

SULFIDE RESIN FOR RUBBER

The present invention relates to rubber compositions having improved physical properties. More particularly, it relates to rubber compositions which are free from scorching and superior in static properties of vulcanized rubber products, particularly modulus at low elongation and hardness as well as in dynamic properties such as heat-build-up resistance.

As to rubber usable for tires and other industrial rubber products, the modulus at low elongation and hardness of rubber are very important because they exert a large influence on the various physical properties of the products. Consequently, various methods for improving the modulus at low elongation and hardness, for example a method comprising increasing the amount of fillers or sulfur, and a method comprising incorporating conventional thermosetting resins or sulfide resins have thus far been studied.

However, increasing the amount of fillers has such drawbacks that the heat-build-up of vulcanized rubber products is increased to shorten the life of the products such as tires and besides and processability is deteriorated. Increasing the amount of sulfur causes sulfur blooming which impairs adhesion. Thus, the amount thereof to be added is limited as a matter of course. On the other hand, conventional thermosetting resins, for example phenol resins and epoxy resins, are self-curable in rubber, and have no co-vulcanizability with rubber, resulting in deterioration of the heat build-up resistance of the vulcanized rubber products, and besides their processability is deteriorated due to the gellation during processing. Also, when sulfur resins, for example condensation resins from phenols and sulfur or sulfur monochloride, are added, the vulcanized rubber has desirable physical properties, but because of its scorching, its use in rubber products is markedly limited. Thus, these known methods are not satisfactory.

For the reasons as described above, the inventors extensively studied ways to obtain rubber compositions which are free from scorching, improved in hardness and modulus at low elongation of the vulcanized rubber products, and superior in dynamic properties particularly heat-build-up resistance. As a result, it was found that a rubber composition comprising a novel sulfur-containing resin and vulcanizable natural or synthetic rubber, preferably together with a compound capable of generating formaldehyde on heating, and more preferably together with said compound and silica, have excellent performance free from the drawbacks of the aforesaid conventional compositions.

The present invention provides a rubber composition comprising vulcanizable natural or synthetic rubber and a sulfur-containing phenol resin in which the hydroxyl groups are wholly or partially acylated (hereinafter referred to as "sulfide resin" for brevity), produced by (1) reacting a component (A) with a component (B), followed by reacting with a component (D), or (2) reacting a component (A) with a component (B), followed by reacting with a component (C) and a component (D) simultaneously or in order, and if desired reacting the resulting phenol resin with an acylating agent, the component (A) being a phenol compound of the following formula, and/or an acylated compound thereof,

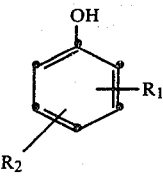

wherein $R_1$ and $R_2$ are each a hydrogen atom, a hydroxyl, carboxyl, amino, $C_1$-$C_{18}$ alkyl, $C_3$-$C_{10}$ cycloalkyl, $C_3$-$C_{10}$ cycloalkenyl or $C_7$-$C_{12}$ aralkyl group or a phenyl group unsubstituted or substituted with at least one $C_1$-$C_3$ alkyl group, the component (B) being a sulfur chloride or sulfur, the component (C) being an aldehyde, and the component (D) being at least one hydroxyaryl compound of the following formula, and/or an acylated compound thereof,

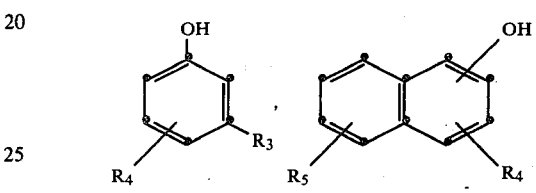

wherein $R_3$ is a $-OR_6$, $-NHR_6$, $-COOR_6$, $-OCOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group, and $R_4$ and $R_5$ are each a hydrogen atom, $-OR_6$, $-NHR_6$, $-COOR_6$, $-OCOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group in which $R_6$ is a hydrogen atom or a $C_1$-$C_4$ alkyl group.

The rubber composition of the present invention comprising the above defined novel sulfide resin is free from according, and excellent in physical properties of the vulcanized rubber products, such as hardness, modulus at low elongation, tensile properties (e.g. tensile strength, 300% modulus) and dynamic properties (e.g. heat-build-up resistance), which properties are very important for tires and other industrial rubber products.

In the present invention, a more desirable effect is obtained by combining the sulfide resin and a compound capable of generating formaldehyde on heating. A further more desirable effect is obtained by combining the above combination with silica.

In the preparation of the present sulfide resin, the component (A) includes phenol, alkyl-, cycloalkyl-, alkenyl-, aryl- or aralkyl-substituted phenols (e.g. cresol, ethylphenol, dimethylphenol, propylphenol, propenylphenol, methylethylphenol, butylphenol, methylpropylphenol, diethylphenol, amylphenol, methylbutylphenol, ethylpropylphenol, cyclopentylphenol, cyclopentylphenol, hexylphenol, phenylphenol, methylamylphenol, ethylbutylphenol, diisopropylphenol, cyclohexylphenol, heptylphenol, toluylphenol, octylphenol, xylylphenol, nonylphenol, decylphenol, dodecylphenol), resorcin, alkyl-substituted resorcins (e.g. methylresorcin, ethylresorcin, propylresorcin, butylresorcin, amylresorcin, hexylresorcin, cashew, urushiol), aromatic carboxylic acids (e.g. oxybenzoic acid, methyloxybenzoic acid, ethyloxybenzoic acid), and acylated products derived therefrom (e.g. phenol acetate, phenol maleate, phenol succinate, phenol phthalate, alkylphenol acetate, alkylphenol maleate, alkylphenol succinate, alkylphenol phthalate, cycloalkylphenol acetate, cycloalkylphenol maleate, cycloalkylphenol succinate, cycloalkylphenol phthalate, allylphenol acetate, allylphenol maleate, allylphenol succinate, allylphenol phthalate, aralkylphenol acetate, aralkylphenol maleate, aralkylphenol succinate, aralkylphenol phthalate, resorcin mono- or di-acetate, resorcin mono- or di-maleate, resorcin mono- or di-succinate, resorcin mono- or di-phthalate, alkylresorcin mono- or di-acetate, alkylresorcin mono- or di-maleate, alkylresorcin mono- or di-succinate, alkylresorcin mono- or di-phthalate, naphthol acetate, naphthol maleate, naphthol succinate, naphthol phthalate, dihydroxynaphthol mono- or di-acetate, dihydroxynaphthol mono- or di-maleate, dihydroxynaphthol mono- or di-succinate, dihydroxynaphthol mono- or di-phthalate).

The component (B) include sulfur and sulfur chlorides such as sulfur monochloride and sulfur dichloride. Of these, sulfur monochloride is particularly preferred.

The component (C) includes formaldehyde, acetaldehyde, butyraldehyde and octyraldehyde. Of these, formaldehyde and acetaldehyde and particularly preferred.

The component (D) includes alkyl-, cycloalkyl-, alkenyl-, aryl- or aralkyl-monosubstituted phenols (e.g. m-cresol, m-ethylphenol, m-propylphenol, m-propenylphenol, m-butylphenol, m-amylphenol, m-hexylphenol, m-heptylphenol, m-octylphenol, m-nonylphenol, m-decylphenol, m-dodecylphenol, m-cyclopentylphenol, m-cyclopentenylphenol, m-cyclohexylphenol, m-toluylphenol, m-xylylphenol), disubstituted phenols (e.g. dimethylphenol, methylethylphenol, methylpropylphenol, diethylphenol, methylbutylphenol, ethylpropylphenol, methylamylphenol, ethylbutylphenol, diisopropylphenol) having one of the substituents at the meta position with respect to the hydroxyl group, resorcin, alkyl-substituted resorcins (e.g. methylresorcin, ethylresorcin, propylresorcin, butylresorcin, amylresorcin, hexylresorcin, cashew, urushiol), m-oxybenzoic acid, aromatic carboxylic acids (e.g. methyloxybenzoic acid, ethyloxybenzoic acid) having one of the two substituents at the meta position with respect to the hydroxl group, naphthol, alkyl-substituted naphthols (e.g. methylnaphthol, dimethylnaphthol, ethylnaphthol, diethylnaphthol, propylnaphthol, methylethylnaphthol, butylnaphthol, methylpropylnaphthol, diethylnaphthol), dihydroxynaphthol and acylated products derived therefrom (e.g. m-alkylphenol acetate, m-alkylphenol maleate, m-alkylphenol succinate, m-alkylphenol phthalate, resorcin mono- or di-acetate, resorcin mono- or di-maleate, resorcin mono- or di-succinate, resorcin mono- or di-phthalate, alkylresorcin mono- or di-acetate, alkylresorcin mono- or di-maleate, alkylresorcin mono- or di-succinate, alkylresorcin mono- or di-phthalate, naphthol acetate, naphthol maleate, naphthol succinate, naphthol phthalate, dihydroxynaphthol mono- or di-acetate, dihydroxynaphthol mono- or dimaleate, dihydroxynaphthol mono- or di-succinate, dihydroxynaphthol mono- or di-phthalate).

Each compound belonging to each component, (A), (B), (C) and (D), may be used alone or in a mixture with at least one other compound.

The sulfide resins of the present invention are produced by one of the following three methods:

(1) The component (A) is reacted with the component (B) at a temperature of 0° to 150° C., preferably 0° to about 70° C., and subsequently the component (D) is added thereto, and allowed to react at a temperature of 0° to 150° C., preferably 0° to about 70° C. The amounts of the component (B) and the component (D) are 1.1 to 1.8 moles and 0.4 to 1.3 moles per mole of the component (A), respectively.

(2) The component (A) is reacted with the component (B) at a temperature of 0° to 200° C., preferably 0° to about 150° C., then the component (C) is added thereto and allowed to react at a temperature of 0° to 200° C., preferably about 20° to about 100° C., and subsequently the component (D) is further added thereto and allowed to react at a temperature of 0° to 200° C., preferably about 20° to about 130° C. The amounts of the components (B), (C) and (D) are 0.3 to 0.8 mole, 0.4 to 1.2 moles and 0.4 to 1.2 moles, per mole of the component (A), respectively.

(3) The above method (2) is carried out, provided that the component (C) and the component (D) are simultaneously added to the reaction mixture of the components (A) and (B) and allowed to react at a temperature of 0° to 200° C., preferably about 20° to about 100° C.

When the compounds to be used as the components (A) and (D) are the same, the subsequent addition of the component (D) is omitted.

Of the above methods, the preferred is the method (2).

The reactions described above can be carried out in the presence or absence of a solvents. If used, the solvents include aromatic hydrocarbons and halohydrocarbons (e.g. benzene, toluene, xylene, chlorobenzene, etc.), aliphatic hydrocarbons and halohydrocarbons (e.g. hexane, cyclohexane, acetate such as ethyl acetate and butyl acetate, chloroform, dichloroethane, etc.).

The sulfide resin thus obtained is a multicomponent reaction product and is not always a single compound. Generally, the resin is a mixture of several components, and it is presumed that the resin contains as the main component the compound represented by the following formula in an unacylated form,

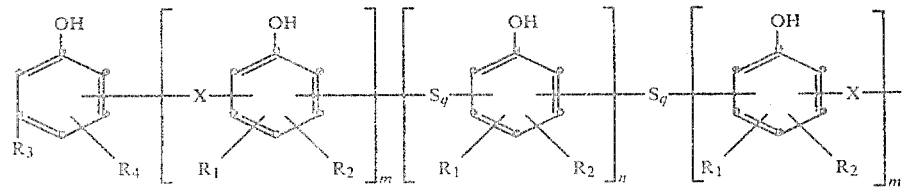

-continued

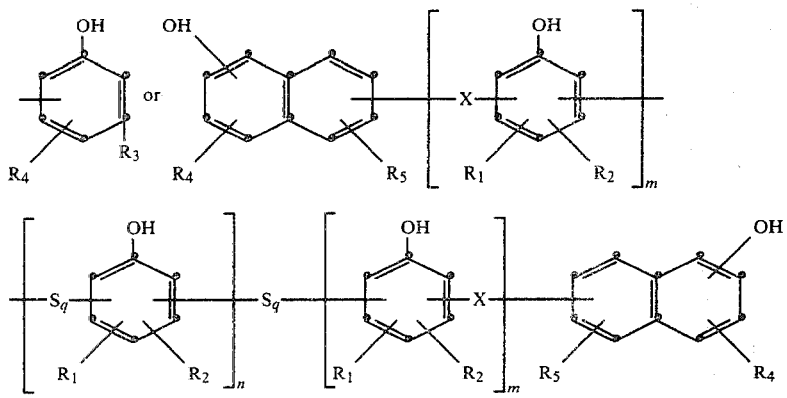

wherein $R_1$, $R_2$, $R_3$, $R_4$ and $R_5$ have the same meanings as defined above, X is $S_p$,

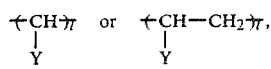

l is an integer of 1 to 3, p and q are each an integer of 1 to 4, provided that the case p and q are 1 at the same time is excluded, m is zero or an integer of 1 to 3 and n is zero or an integer of 1 to 6.

When the hydroxyl groups contained in the resin obtained above remain unacylated or insufficiently acylated, the resin can be subjected to reaction with an acylating agent to acylate all or a part of the hydroxyl groups. As the acylating agent, there may be given for example carboxylic acids of their anhydrides (e.g. acetic acid, acetic anhydride, maleic acid, maleic anhydride, succinic acid, succinic anhydride, phthalic acid, phthalic anhydride, benzoic acid, benzoic anhydride), and acid chlorides (e.g. acetyl chloride, oxalyl chloride, benzoyl chloride, phthaloyl chloride). Of these, the preferred are acid anhydrides (e.g. acetic anhydride) and acid chlorides (e.g. acetyl chloride). The acylation is carried out at a temperature of 0° to 200° C.

As described above, the sulfide resin usable for the rubber composition in accordance with the present invention may be produced according to either the method comprising the production of the resin and subsequent acylation thereof, or the method comprising the production of the sulfide resin using the acylated starting compounds as the component (A) and/or component (D).

The compound capable of generating formaldehyde on heating preferably usable for the production of the present rubber composition means a compound which is capable of generating formaldehyde during vulcanization or molding process, forming the methylol derivative of the foregoing sulfur-containing acylated resins. The compound includes, for example, methylolmelamine derivatives, oxazolidine derivatives, methyleneaminoacetronitrile trimer, tetrahydro-1,3-oxazine, N-methylolmaleimide, azomethine derivatives, hexamethylenetetramine and paraformaldehyde.

As the vulcanizable rubber used in the present invention, there may be given for example natural rubber (NR), styrene/butadiene rubber (SBR), polybutadiene rubber (BR), polyisoprene rubber (IR), chloroprene rubber (CR), acrylonitrile/butadiene rubber (NBR), isoprene/isobutylene rubber (IIR) and ethylene/propylene terpolymer (EPDM).

The compounding ratio of the sulfide resin is generally 0.2 to 20 parts by weight per 100 parts by weight of rubber (hereinafter referred to as PHR), preferably 0.5 to 10 PHR. That of the compound capable of generating formaldehyde is up to 10 PHR, preferably 0.2 to 10 PHR, and more preferably 0.5 to 3 PHR.

In addition to the compound capable of generating formaldehyde, silica may be compounded to improve a rubber-modifying effect. The compounding ratio of the silica is up to 80 PHR, preferably 2 to 80 PHR, and more preferably 2 to 5 PHR.

The rubber compositions of the present invention may contain suitable carbon black (e.g. HAF, SAF, SRF), vulcanization ingredients (e.g. sulfur, vulcanization accelerator, stearic acid, zinc oxide), and the like.

The rubber compositions of the present invention can be formulated, in a conventional manner, for example, by kneading by means of open rolls or kneaders such as a Banbury mixer and transfer mixer. In this case, a pre-compound comprising the sulfide resin, the compound capable of generating formaldehyde on heating and/or other components (e.g. silica, carbon black, zinc oxide) may be added to the rubber in situ.

The rubber compositions of the present invention thus obtained are free from scorching, and excellent in physical properties of the vulcanized rubber products, e.g. hardness and modulus at low elongation, and dynamic properties such as heat-build-up resistance.

The rubber compositions of the present invention can be used for the production of industrial rubber products, particularly for the production of tires, more specifically tread parts and the like. Further, they can be used for the production of tire carcass parts or breaker parts because they are superior in adhesion to reinforcing materials (e.g. nylon, rayon, brass-plated steel code) after vulcanization.

The present invention will be illustrated with reference to the following Examples, which are only illustrative and not limitative for the scope of the present invention.

Reference Example 1

To a 1-liter flask equipped with a stirrer, thermometer, dropping funnel and condenser were added p-tert-octylphenol (206 g, 1 mole) and toluene (280 ml), and the mixture was heated to 70° C. to form a solution. Sulfur monochloride (67.6 g, 0.5 mole) was added dropwise thereto at 70° to 80° C. After the addition was finished, the solution was heated to 90° to 100° C. and kept at the same temperature for 6 hours, during which the produced hydrogen chloride was vented from the system. After the reaction was finished, water (15 ml) was added to the system which was then neutralized with 15% aqueous sodium hydroxide solution, and 88% paraformaldehyde (34.1 g, 1 mole) was added thereto. Thereafter, 15% aqueous sodium hydroxide solution (13.4 g) was added dropwise to the reaction solution over 1 hour at 60° to 65° C., and after the addition was finished, the reaction solution was heated to 85° to 90° C. and kept at the same temperature for 4 hours. After cooling to 40° to 45° C., resorcin (110 g, 1 mole) and oxalic acid dihydrate (3.2 g) were added. The mixture was gradually heated to remove water completely as an azeotropic mixture with toluene between 85° C. and 115° C., with the toluene separated being recycled to the reaction system. After dehydration, toluene (100 ml) and water (50 ml) were added, and the solution was stirred and allowed to stand. The aqueous layer containing inorganic substances was removed by phase-separation. Toluene was evaporated from the toluene layer to obtain 323 g of a sulfur-containing phenol resin having a softening point of 105° C.

EXAMPLE 1

The sulfur-containing phenol resin (50 g) obtained in Reference Example 1 was mixed with toluene (100 ml) by heating to 70° to 80° C. Acetic anhydride (10.2 g, 0.1 mole) was added to the mixture over 1 hour at the same temperature. After the reaction solution was kept at the same temperature for 3 hours, it was cooled to room temperature, and toluene (100 ml) and water (100 ml) were added to the solution which was then stirred, allowed to stand and separated into two layers.

Water (100 ml) was added to the oily layer (toluene layer) which was then washed and separated into two layers. Toluene was evaporated from the toluene layer to obtain 53.2 g of a sulfur-containing acylated resin having a softening point of 102° C. This resin was taken as a sulfur-containing acylated resin (a).

This resin showed absorption at 1750 cm$^{-1}$ by IR spectrum, which means that acetylation was carried out.

EXAMPLE 2

59.8 Grams of a sulfur-containing acylated resin (softening point, 98° C.) was obtained in completely the same manner as in Example 1 except that the amount of acetic anhydride was changed to 25.5 g (0.25 mole). This resin was taken as a sulfur-containing acylated resin (b).

EXAMPLE 3

69.4 Grams of a sulfur-containing acylated resin (softening point, 125° C.) was obtained in completely the same manner as in Example 1 except that 19.6 g (0.2 mole) of maleic anhydride was used in place of acetic anhydride. This resin was taken as a sulfur-containing acylated resin (c).

EXAMPLE 4

342 Grams of a sulfur-containing phenol resin (softening point, 118° C.) was obtained in completely the same manner as in Reference Example 1 except that 138 g (1 mole) of m-oxybenzoic acid was used in place of resorcin.

Using this resin, 52.9 g of a sulfur-containing acylated resin (softening point, 109° C.) was obtained in completely the same manner as in Example 1. This resin was taken as a sulfur-containing acylated resin (d).

EXAMPLE 5

346 Grams of a sulfur-containing phenol resin (softening point, 107° C.) was obtained in completely the same manner as in Reference Example 1 except that 144 g (1 mole) of β-naphthol was used in place of resorcin.

Using this resin, 53.2 g of a sulfur-containing acylated resin (softening point, 99° C.) was obtained in completely the same manner as in Example 1. This resin was taken as a sulfur-containing acylated resin (e).

EXAMPLE 6

A solution of sulfur monochloride (203 g, 1.5 mole) in hexane (200 ml) was added to the same apparatus as used in Reference Example 1. A solution of sec-amylphenol (164 g, 1 mole) in toluene (200 ml) was added dropwise thereto over 2 hours while keeping the temperature at 30° C. or less, during which the produced hydrogen chloride was vented from the system. After addition was finished, nitrogen gas was introduced into the system to vent hydrogen chloride from of the system. After removal from hydrogen chloride was finished, a solution of resorcin (110 g, 1 mole) in toluene (200 ml) was added to the reaction solution over 2 hours at 30° to 40° C., and produced hydrogen chloride was similarly let out of the system. Thereafter, nitrogen gas was introduced into the system to vent the remaining hydrogen chloride from the system. The reaction solution was neutralized with 5% aqueous ammonia (1g), and the solvent was removed under reduced pressure at less than 130° C. to obtain 330 g of a sulfur-containing phenol resin (softening point, 95° C.).

Using this resin, 54.0 g of a sulfur-containing acylated resin (softening point, 88° C.) was obtained in completely the same manner as in Example 1. This resin was taken as a sulfur-containing acylated resin (f).

EXAMPLE 7

408 Grams of a sulfur-containing acylated resin (softening point, 98° C.) was obtained in completely the same manner as in Reference Example 1 except that 194 g (1 mole) of resorcin diacetate was used in place of resorcin. This resin was taken as a sulfur-containing acylated resin (g).

EXAMPLE 8

To a 1-liter flask equipped with a stirrer, thermometer, dropping funnel and condenser were added p-tert-octylphenol (206 g, 1 mole) and toluene (280 ml), and the mixture was heated to 70° C. form a solution. Sulfur monochloride (67.6 g, 0.5 mole) was added dropwise thereto at 70° to 80° C. After addition was finished, the solution was heated to 90° to 100° C. and kept at the same temperature for 6 hours, during which produced hydrogen chloride was vented from the system. After the reaction was finished, water (15 ml) was added to the system which was then neutralized with 15% aqueous sodium hydroxide solution. Thereafter, 88% paraformaldehyde (34.1 g, 1 mole) and resorcin (110 g, 1 mole) were added simultaneously thereto, and 15% aqueous sodium hydroxide solution (13.4 g) was added thereto at 40° to 45° C. over 1 hour. After addition was finished, the reaction solution was heated to 60° C. and kept at the same temperature for 1 hour, and then oxalic acid dihydrate (3.2 g) was added. The mixture was gradually heated to remove water completely as an azeotropic mixture with toluene between 85° C. and 115° C., while the toluene separated being recycled to the reaction system. After dehydration, toluene (100 ml) and water (50 ml) were added, and the solution was stirred and allowed to stand. The aqueous layer containing inorganic substances was removed by phase-separation. Toluene was evaporated from the toluene layer to obtain 322 g of a sulfur-containing phenol resin having a softening point of 107° C.

Using this resin, 53.1 g of a sulfur-containing acylated resin (softening point, 104° C.) was obtained in the same manner as in Example 1. This resin was taken as a sulfur-containing acylated resin (h).

EXAMPLE 9

Rubber compositions were prepared using B-type Banbury mixer. The kind and amount of compounding ingredients are shown in Table 1. The Mooney scorch test (test temperature, 130° C.) was carried out according to JIS-K-6300.

Next, the compositions were vulcanized at 145° C. for 40 minutes, and specified test pieces were prepared using the vulcanized rubber. Using these test pieces, a tension test and a test for modulus at low elongation were carried out according to JIS-K-6301.

Heat-build-up was examined by the dynamic fatigue test using a Goodrich flexometer (ASTM-D-623).

Further, a blooming test was carried out by allowing the test pieces to stand at room temperature (25° C.) for 3 days.

The results are shown in Table 1.

EXAMPLE 10

Rubber compositions were prepared on a 10-inch roll of which the surface temperature was kept at 110° C. The kind and amount of compounding ingredients are shown in Table 2.

The rubber compositions obtained were tested in the same manner as in Example 9. The results are shown in Table 2.

TABLE 1

| | Example of present invention | | | | | | | Comparative example | | | | | |
|---|---|---|---|---|---|---|---|---|---|---|---|---|---|
| | Experiment No. | | | | | | | | | | | | |
| Item | 1 | 2 | 3 | 4 | 5 | 6 | 7 | 8 | 9 | 10 | 11 | 12 | 13 |
| Ingredient (parts by weight) | | | | | | | | | | | | | |
| Natural rubber | | | | 100.0 | | | | | | 100.0 | | | |
| Stearic acid | | | | 3.0 | | | | | | 3.0 | | | |
| Zinc oxide | | | | 5.0 | | | | | | 5.0 | | | |
| Aromatic process oil *1 | | | | 3.0 | | | | | | 3.0 | | | |
| Vulcanization accelerator *2 | | | | 0.8 | | | | | | 0.8 | | | |
| Sulfur | 2.0 | 2.0 | 2.0 | 2.0 | 2.0 | 2.0 | 2.0 | 2.0 | 2.0 | 2.0 | 4.0 | 2.0 | 2.0 |
| HAF Black | 45.0 | 45.0 | 45.0 | 45.0 | 45.0 | 45.0 | 45.0 | 45.0 | 45.0 | 60.0 | 45.0 | 45.0 | 45.0 |
| Silica | | | 10.0 | | | | | | | | | | 10.0 |
| Compound capable of generating formaldehyde *3 | | 1.0 | 1.0 | | | | | | 1.0 | | | | 1.0 |
| RF resin *4 | | | | | | | | | 2.0 | | | | |
| Sulfur-containing phenol resin *5 | | | | | | | | 2.0 | | | | | |
| Sulfur-containing acylated resin | | | | | | | | | | | | | |
| a | 2.0 | 2.0 | 2.0 | 5.0 | | | | | | | | | |
| b | | | | | 2.0 | | | | | | | | |
| c | | | | | | 2.0 | | | | | | | |
| h | | | | | | | 2.0 | | | | | | |
| Physical properties | | | | | | | | | | | | | |
| Lowest value Mooney scorch | 28.8 | 28.7 | 29.1 | 28.8 | 27.8 | 28.5 | 28.9 | 33.4 | 32.0 | 38.2 | 29.5 | 29.6 | 30.0 |
| ML 5 | 16'40" | 16'20" | 16'30" | 17'00" | 16'50" | 17'00" | 16'10" | 7'20" | 7'00" | 14'20" | 12'30" | 16'40" | 16'50" |
| ML 35 20'00" | 19'50" | 20'10" | 20'40" | 20'40" | 21'10" | 19'50" | 12'40" | 13'10" | 19'00" | 15'40" | 19'55" | 20'30" | |
| ML Δ30 | 3'20" | 3'30" | 3'40" | 3'40" | 3'50" | 4'10" | 3'40" | 5'20" | 6'10" | 4'40" | 3'10" | 3'15" | 3'40" |
| Tensile property | | | | | | | | | | | | | |
| TS (kg/cm²) | 242 | 255 | 272 | 264 | 244 | 243 | 245 | 238 | 173 | 176 | 216 | 220 | 219 |
| M 300 (kg/cm²) | 168 | 174 | 198 | 192 | 163 | 167 | 167 | 167 | 139 | 159 | 170 | 130 | 128 |
| Hardness | 72 | 74 | 79 | 78 | 73 | 73 | 73 | 73 | 72 | 74 | 73 | 66 | 68 |
| Other properties | | | | | | | | | | | | | |
| Heat-build-up (°C.) | 42 | 38 | 40 | 36 | 40 | 42 | 43 | 42 | 99 | 102 | 47 | 52 | 74 |
| Blooming property | o | o | o | o | o | o | o | o | o | o | x | o | o |

*1 Aromax (produced by Fuji Kōsan Co.)
*2 N-cyclohexylbenzothiazylsulfamide (Soxinol CZ, produced by Sumitomo Chemical Company, Limited)
*3 Methylolmelamine derivative (Sumikanol 507, produced by Sumitomo Chemical Company, Limited)
*4 Resorcin formaldehyde resin (Sumikanol 600, produced by Sumitomo Chemical Company, Limited)
*5 Sulfur-containing phenol resin obtained in Reference Example 1.

TABLE 2

| Item | Example of present invention Experiment No. | | | | | | Comparative example | | |
|---|---|---|---|---|---|---|---|---|---|
| | 14 | 15 | 16 | 17 | 18 | 19 | 20 | 21 | 22 |
| Ingredient (parts by weight) | | | | | | | | | |
| SBR 1500 | | | | | 100.3 | | | | |
| HAF Black | | | | | 50.0 | | | | |
| Stearic acid | | | | | 3.0 | | | | |
| Zinc oxide | | | | | 5.0 | | | | |
| Aromatic process oil *1 | | | | | 9.0 | | | | |
| Vulcanization accelerator *2 | | | | | 1.0 | | | | |
| Sulfur | 2.0 | 2.0 | 2.0 | 2.0 | 2.0 | 2.0 | 2.0 | 4.0 | 2.0 |
| Compound capable of generating formaldehyde *3 | | 1.0 | | | | | | | |
| Sulfur-containing phenol resin *4 | | | | | | | 2.0 | | |
| Sulfur-containing acylated resin | | | | | | | | | |
| (b) | 2.0 | 2.0 | | | | | | | |
| (d) | | | 2.0 | | | | | | |
| (e) | | | | 2.0 | | | | | |
| (f) | | | | | 2.0 | | | | |
| (g) | | | | | | 2.0 | | | |
| Physical properties | | | | | | | | | |
| Lowest value | 33.1 | 33.2 | 34.2 | 33.5 | 32.8 | 33.0 | 37.8 | 34.5 | 34.9 |
| Mooney scorch | | | | | | | | | |
| ML 5 | 12'20" | 12'30" | 13'00" | 12'10" | 12'20" | 12'25" | 6'50" | 10'20" | 12'14" |
| ML 35 | 15'00" | 14'50" | 15'30" | 14'30" | 14'50" | 15'10" | 10'10" | 12'40" | 14'50" |
| ML Δ30 | 2'40" | 2'20" | 2'30" | 2'20" | 2'30" | 2'45" | 3'20" | 2'40" | 2'35" |
| Tensile Property | | | | | | | | | |
| TS (kg/cm$^2$) | 276 | 288 | 268 | 277 | 279 | 278 | 278 | 246 | 257 |
| M 300 (kg/cm$^2$) | 227 | 234 | 226 | 224 | 230 | 231 | 228 | 225 | 152 |
| Hardness | 74 | 77 | 74 | 75 | 74 | 74 | 75 | 73 | 63 |
| Other properties | | | | | | | | | |
| Heat-build-up (°C.) | 33 | 30 | 34 | 31 | 32 | 33 | 33 | 34 | 44 |
| Blooming property | o | o | o | o | o | o | o | x | o |

*1 Same as described above.
*2 Same as described above.
*3 Oxazolidine derivative (Bonding agent M-3, produced by Uniroyal Co.).
*4 Same as described above.

What is claimed is:

1. A rubber composition comprising vulcanizable natural or synthetic rubber and a sulfide resin produced by (1) reacting a component (A) with a component (B), followed by reacting with a component (D), or (2) reacting a component (A) with a component (B), followed by simultaneously or sequentially reacting with a component (C) and a component (D), and with or without reacting the resulting phenol resin with an acylating agent, the component (A) being a phenol compound of the following formula, and/or an acylated compound thereof,

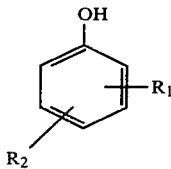

wherein $R_1$ and $R_2$ are each a hydrogen atom, a hydroxyl, carboxyl, amino, $C_1$-$C_{18}$ alkyl, $C_3$-$C_{10}$ cycloalkyl, $C_3$-$C_{10}$ cycloalkenyl or $C_7$-$C_{12}$ aralkyl group or a phenyl group unsubstituted or substituted with at least one $C_1$-$C_3$ alkyl group, the component (B) being a sulfur chloride or sulfur, the component (C) being an aldehyde, and the component (D) being at least one hydroxyaryl compound of the following formula, and/or an acylated compound thereof,

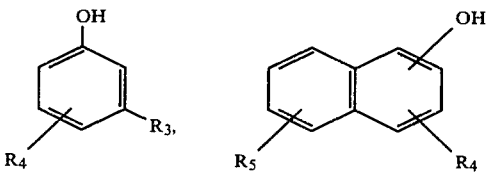

wherein $R_3$ is a —$OR_6$, —$NHR_6$, —$COOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group, and $R_4$ and $R_5$ are each a hydrogen atom, —$OR_6$, —$NHR_6$, —$COOR_6$, —$OCOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group in which $R_6$ is a hydrogen atom or a $C_1$-$C_4$ alkyl group.

2. A rubber composition according to claim 1, wherein the amount of the sulfide resin is 0.2 to 20 parts by weight per 100 parts by weight of rubber.

3. A rubber composition according to claim 1, wherein the composition additionally comprises a compound capable of generating formaldehyde on heating.

4. A rubber composition according to claim 3, wherein the amount of the compound is 0.2 to 10 parts by weight based on 100 parts by weight of rubber.

5. A rubber composition according to claim 3, wherein the compound is a member selected from the group consisting of methylolmelamines, oxazolidines, methyleneaminoacetonitrile trimer, tetrahydro-1,3-oxazine, N-methylolmaleimide, azomethines, hexamethylenetetramine and paraformaldehyde.

6. A rubber composition according to claim 3, wherein the composition additionally comprises silica.

7. A rubber composition according to claim 6, wherein the amount of silica is 2 to 80 parts by weight per 100 parts by weight of rubber.

8. A rubber composition according to claim 1, wherein the molar ratio of the component (A)/(B)/(D) in the reaction (1) is 1:1.1 to 1.8:0.4 to 1.3.

9. A rubber composition according to claim 1, wherein the molar ratio of the component (A)/(B)/(C)/(D) in the reaction (2) is 1:0.3 to 0.8:0.4 to 1.2:0.4 to 1.2.

10. A vulcanized rubber product obtained from the rubber composition of claim 1.

11. A sulfide resin produced by (1) reacting a component (A) with a component (B), followed by reacting with a component (D), or by reacting a component (A) with a component (B), followed by simultaneously or sequentially reacting with a component (C) and a component (D), and with or without reacting the resulting phenol resin with an acylating agent, the component (A) being a phenol compound of the following formula, and/or an acylated compound thereof,

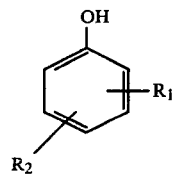

wherein $R_1$ and $R_2$ are each a hydrogen atom, a hydroxyl, carboxyl, amino, $C_1$-$C_{18}$ alkyl, $C_3$-$C_{10}$ cycloalkyl, $C_3$-$C_{10}$ cycloalkenyl or $C_7$-$C_{12}$ aralkyl group or a phenyl group unsubstituted or substituted with at least one $C_1$-$C_3$ alkyl group, the component (B) being a sulfur chloride or sulfur, the component (C) being an aldehyde, and the component (D) being at least one hydroxyaryl compound of the following formula, and/or an acylated compound thereof,

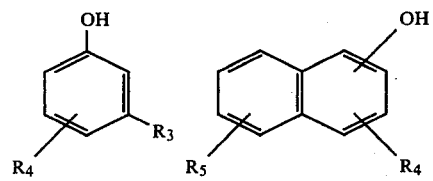

wherein $R_3$ is a —$OR_6$, —$NHR_6$, —$COOR_6$, —$OCOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group, and $R_4$ and $R_5$ are each a hydrogen atom, —$OR_6$, —$NHR_6$, —$COOR_6$, —$OCOR_6$, phenyl group unsubstituted or substituted with at least one $C_1$-$C_3$ alkyl, $C_1$-$C_{18}$ alkyl, $C_3$-$C_{10}$ cycloalkyl, $C_3$-$C_{10}$ cycloalkenyl or $C_7$-$C_{12}$ aralkyl group in which $R_6$ is a hydrogen atom or a $C_1$-$C_4$ alkyl group.

* * * * *